（12） United States Patent
Davidson et al.

(10) Patent No.: US 9,154,763 B2
(45) Date of Patent: Oct. 6, 2015

(54) SYSTEM AND METHOD FOR REDUCING ARTIFACTS CAUSED BY VIEW-DEPENDENT LIGHTING COMPONENTS

(71) Applicants: Alan L. Davidson, Sherman Oaks, CA (US); Parag Halvadar, Cerritos, CA (US); Peter H. Palombi, Los Angeles, CA (US)

(72) Inventors: Alan L. Davidson, Sherman Oaks, CA (US); Parag Halvadar, Cerritos, CA (US); Peter H. Palombi, Los Angeles, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 162 days.

(21) Appl. No.: 13/649,788

(22) Filed: Oct. 11, 2012

(65) Prior Publication Data

US 2014/0105483 A1  Apr. 17, 2014

(51) Int. Cl.
*G06K 9/00* (2006.01)
*H04N 13/00* (2006.01)
*H04N 13/02* (2006.01)

(52) U.S. Cl.
CPC ....... *H04N 13/0018* (2013.01); *H04N 13/0275* (2013.01); *H04N 13/0025* (2013.01)

(58) Field of Classification Search
None
See application file for complete search history.

(56) References Cited

U.S. PATENT DOCUMENTS

| | | | |
|---|---|---|---|
| 6,009,189 A * | 12/1999 | Schaack | 382/154 |
| 6,281,904 B1 * | 8/2001 | Reinhardt et al. | 345/582 |
| 8,090,160 B2 | 1/2012 | Kakadiaris et al. | |
| 8,477,241 B2 * | 7/2013 | Chang et al. | 348/383 |
| 8,564,641 B1 * | 10/2013 | Levin et al. | 348/42 |
| 2006/0034487 A1 * | 2/2006 | Franz | 382/104 |
| 2008/0007559 A1 | 1/2008 | Kalaiah et al. | |
| 2009/0009658 A1 * | 1/2009 | Aufranc et al. | 348/383 |
| 2011/0285822 A1 | 11/2011 | Dai et al. | |
| 2012/0182397 A1 * | 7/2012 | Heinzle et al. | 348/47 |
| 2012/0242790 A1 * | 9/2012 | Sandrew et al. | 348/43 |

FOREIGN PATENT DOCUMENTS

WO  2011087451 A1  7/2011

* cited by examiner

*Primary Examiner* — Daniel Mariam
(74) *Attorney, Agent, or Firm* — Mark D. Wieczorek; Mayer & Williams PC

(57) ABSTRACT

Systems and methods are provided for resolving artifacts in view-dependent components. The system and method apply a different stereo camera pair to view-dependent versus non-view-dependent or independent rays. In this way the lighting components may be independently dialed to art direct specular components versus diffuse components.

20 Claims, 5 Drawing Sheets

SYSTEM AND METHOD FOR REDUCING ARTIFACTS CAUSED BY VIEW-DEPENDENT LIGHTING COMPONENTS

BACKGROUND

Movies presented in 3-D are enjoying tremendous popularity. One way of achieving three-dimensional images is by way of stereography, which is one of the oldest ways of producing a 3-D image for a viewer. In stereography two images are captured and presented to a user, one from a left camera and for the left eye of a viewer, and one from a right camera and for a right eye of a viewer.

Advances in stereography have been matched with advances in computer graphics, which can now create highly realistic images, including accounting for the effects of complex lighting environments. In some cases, however, some such complex lighting calculations create images that, though technically correct, may not result in the most desirable image. Accordingly, there is a need for improvement in computer graphics methods employing such lighting calculations.

SUMMARY

As introduced above, the effects of current lighting calculations create images that, though technically correct, sometimes result in images that do not seem correct to a viewer's eye. For example, ghosting effects may be seen, or specular reflections may appear too far apart in a left eye versus a right eye causing an image of an object to appear to "float" above the surface. Such artifacts are typically associated with view-dependent components, such as lighting components caused by specular effects, including reflections, refractions, and caustics, because such components result in rays that can differ between a left eye and a right eye. View-independent components, such as are caused by diffuse lighting, are generally the same between eyes, and generally do not give rise to such artifacts.

In systems and methods disclosed below, to resolve artifacts, view-dependent components may employ a different set of stereo camera offsets then view-independent components, or different from those that gave rise to the artifacts, and in this way lighting components may be independently "dialed" to art direct view-dependent components versus view-independent components, e.g., the stereo depths thereof.

In one aspect, the invention is directed towards a method for resolving an artifact caused by a view-dependent lighting component, including: detecting an artifact caused by a view-dependent lighting component imaged by a stereo camera having a set of operating parameters; and altering the operating parameters such that the artifact is resolved.

Implementations of the invention may include one or more of the following. The operating parameters may include an intraocular distance. The stereo camera may be a virtual stereo camera. The altering may be performed in a renderer following a specular pass. The stereo camera may include a first eye camera and a second eye camera, and may further include: performing a re-projection step for one or more view independent components of an image from the first eye camera to create an image for the second eye camera; and performing a rendering step for one or more view-dependent components of an image to create an image for the second eye camera. The artifact may be caused by a view-dependent lighting component that is specular. The specular component may be caused by reflection, refraction, or a caustic. The detecting may be performed with user input. The method may further include providing a user interface for displaying images from the stereo camera and for accepting user input on which portions of the images constitute artifacts. The detecting may be performed automatically. The stereo camera may include a first eye camera and a second eye camera, and the detecting may further include: detecting a first feature imaged by the first eye camera caused by a view-dependent lighting component; detecting a second feature, corresponding to the first, imaged by the second eye camera caused by the view-dependent lighting component; determining a perceived depth of the feature using the detected first and second feature; and if the perceived depth is not appropriate for the feature, then adjusting the perceived depth by adjusting one or more parameters of the first and second eye cameras such that the perceived depth is appropriate for the feature. If the perceived depth is not appropriate for the feature due to a spacing between the first and second features by an amount exceeding 2% of the screen space, then the method may further include adjusting the perceived depth by adjusting one or more parameters of the first and second eye cameras such that the perceived depth is appropriate. The one or more parameters may include an intraocular distance or a convergence. The stereo camera may include a first eye camera and a second eye camera, and the detecting may further include: detecting an existence of a feature imaged by the first eye camera caused by a view-dependent lighting component; detecting if a corresponding feature has been imaged by the second eye camera caused by the view-dependent lighting component; if a corresponding feature has not been imaged by the second eye camera, then performing the altering. The altering may include generating a corresponding feature for the second eye camera. The stereo camera may include a first eye camera and a second eye camera, and the detecting may further include: detecting a first shape of a feature imaged by the first eye camera caused by a view-dependent lighting component; detecting a second shape of the feature, corresponding to the first, imaged by the second eye camera and caused by the view-dependent lighting component; determining if the first shape is similar to the second shape; and if the shapes are not similar, then adjusting one or both of the shapes such that the shapes are similar.

In another aspect, the invention is directed towards a non-transitory computer-readable medium, including instructions for causing a computing environment to perform the above method.

In another aspect, the invention is directed towards a system for resolving an artifact caused by a view-dependent lighting component, including: a detection module, the detection module for detecting an artifact caused by a view-dependent lighting component imaged by a stereo camera having a set of operating parameters; and an altering module for altering the operating parameters such that the artifact is resolved.

Implementations of the invention may include one or more of the following. The altering module may form part of a renderer and may adjust the operating parameters including an intraocular distance or a convergence. The system may further include a user interface module for accepting user input about portions of images that are artifacts. The system may include a first virtual eye camera and a second virtual eye camera, and the detection module may be configured for detecting if: a feature caused by a view-dependent component imaged by the first and second eye cameras has an inappropriate stereo depth; a shape of a feature imaged by the first camera is substantially different than a shape of the feature imaged by the second camera; or a feature exists in an image from the first camera but not in an image from the second camera.

Advantages of certain implementations of the invention may include one or more of the following. Undesirable artifacts may be minimized in a convenient way. Artifacts caused by many types of view-dependent effects may be treated. Such artifacts may be treated during the rendering process, allowing treatments to be made and reviewed (and approved) in a rapid and convenient fashion. Other advantages will be apparent to one of ordinary skill in the art, given the description that follows, including the figures and claims.

BRIEF DESCRIPTION OF THE DRAWINGS

Like reference numerals denote like elements throughout.

DETAILED DESCRIPTION

Figure 1:
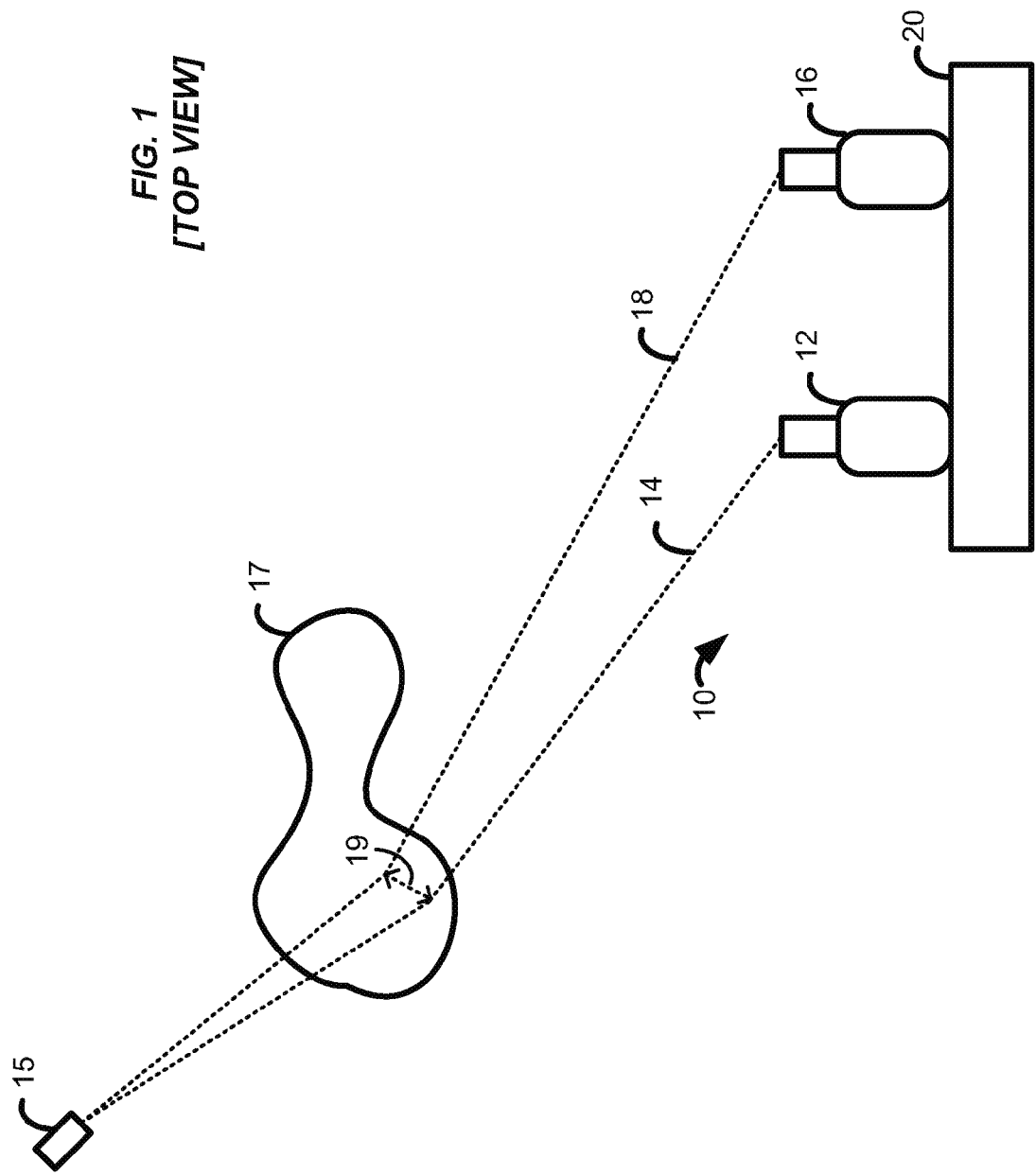
FIG. 1 is a schematic depiction of a stereo camera system in which geometry has given rise to an artifact relating to a view-dependent lighting component.

Referring to FIG. 1, a stereo camera system 10 is illustrated with a left stereo camera 12 and a right stereo camera 16 situated on a mount 20. The stereo camera system 10 is in this example virtual, as is the object 17, the same generally being a three-dimensional modeled object.

The left stereo camera 12 is shown as imaging an object 17 with a number of rays 14 (only one is shown) and the right stereo camera 18 images the object 17 with rays 18. The rays 14 and 18 originate at a source of light 15. The stereographic dimensionality is in part caused by the different locations on the viewing plane seen by the viewer's eyes. For example, the reflection of the light source 15 is at a certain depth in part because of the separation 19 experienced by the viewer's eyes.

Figure 2:
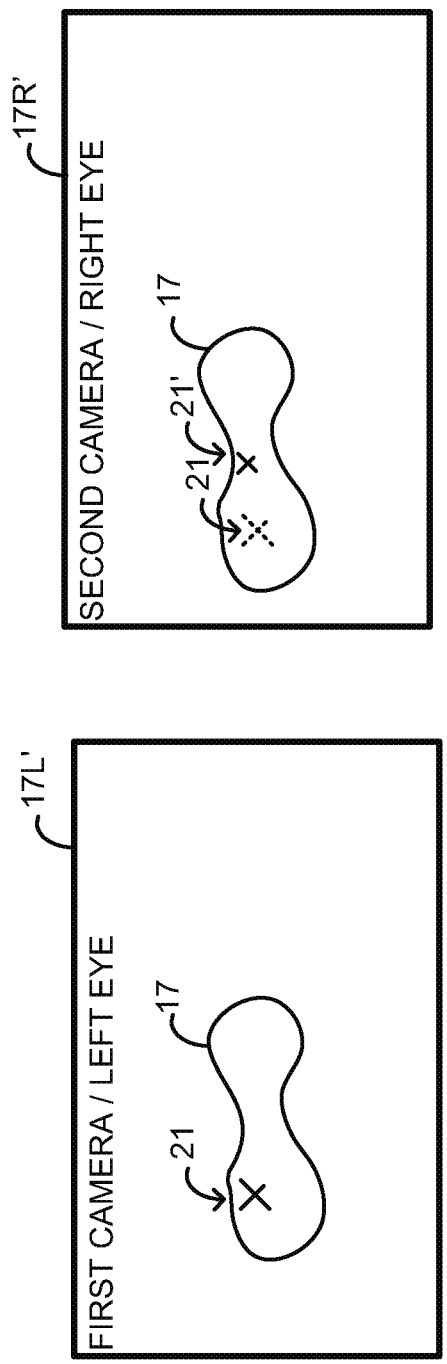
FIG. 2 are exemplary images that may be seen from the system of FIG. 1.

FIG. 2 illustrates a viewing plane 17L' for the first camera and for the viewer's left eye, as well as a viewing plane 17R' for the second camera and for the viewer's right eye. It will be understood that the terms "left" and "right" are arbitrary, and so long as a set of stereo cameras are employed, the system and method may be employed.

In FIG. 2, the object 17 is seen at a first location for the left eye and at a second location for the right eye, where the second location is displaced horizontally from the first location. This horizontal displacement gives rise to the dimensionality of the image in 3-D. A feature or highlight is illustrated in the image 17L' at a location 21 and a corresponding feature or highlight is illustrated in the image 17R' at location 21'. The location 21 is also illustrated in dotted lines in 17R' to show the distance between the locations of the features.

The different locations of the features give rise to the stereographic 3-D effect, but can also give rise to perceptual difficulties for a viewer if the distance between features is overly large, or beyond an appropriate amount, as it may often be for rough surfaces which tend to separate the features, because the perceived depth of the artifact may no longer correspond to reality, even though the location is in fact "correct" or otherwise "physical". For example, the specular reflection off a drum kit may appear to float in front of the drum kit, rather than appear on the drum kit or just beyond the surface of the drum kit. Such artifacts can also occur if features are closer than appropriate.

Such artifacts can emerge from specular effects such as reflections, refractions, caustics, and the like. In general, such artifacts arise from view-dependent components of lighting, as these are ones that differ from eye to eye. In FIG. 2 it has been indicated that an overly large spacing in the perceived location of a highlight or feature (the terms are used interchangeably in this specification) can cause an artifact or otherwise cause strain. In this regard, an overly large spacing may include one in which objects are separated more than 2% of screen space apart, or otherwise significantly greater than appropriate, as greater separations tend to be disturbing to a viewer's eyes. In another specific example, if reflected objects do not appear just beyond the surface of reflection, an artifact may be assumed, e.g., if the perceived depth of the highlight makes it float in front of the object, as a pleasing highlight generally appears just beyond the object. Other types of artifacts include a difference of shape of a feature as perceived between a left and a right eye. Another type of artifact can be caused by a feature appearing in one eye but not the other due to an occlusion or due to the shape of the reflective surface. In still other cases, a reflection may appear that is so deep that it is distracting from the rest of the scene or from where the director wants the focus of the audience's attention. In many cases, such artifacts are generated by rough objects, although generally most objects can give rise to artifacts under the right lighting conditions.

Figure 3:
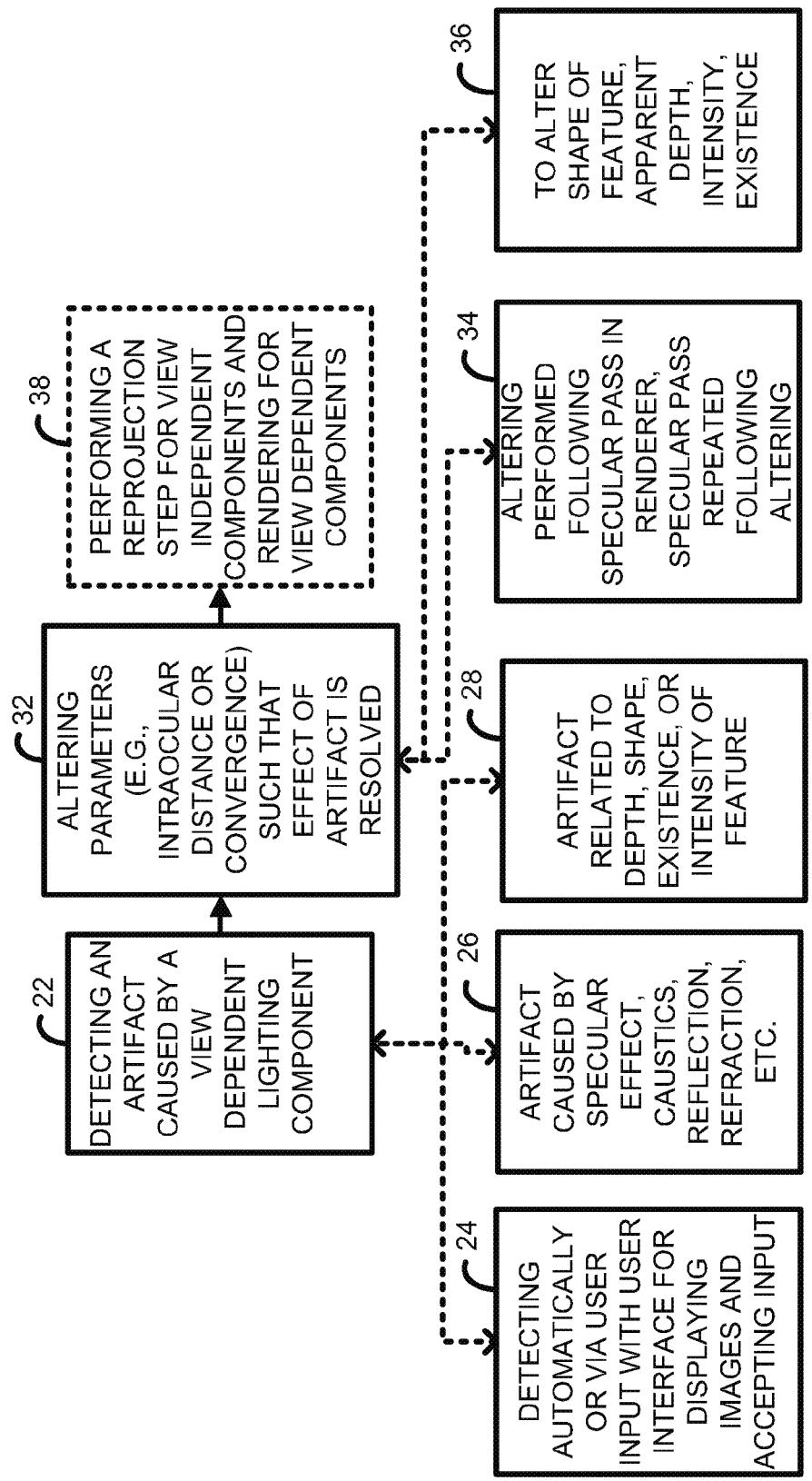
FIG. 3 is a flowchart of a method according the principles described here.

The solution for such artifacts is described in the flowchart 30 of FIG. 3. In a first step, an artifact is detected, the same caused by a view-dependent lighting component (step 22). The detection can be performed in a number of ways. For example, the detecting may happen automatically or with user input (step 24). Where performed automatically, a computing environment may detect locations of features or may detect if the perceived depth location of an object is incommensurate with an appropriate depth, where the appropriate depth is determined by calculation, by a lookup table, by expert rules, or the like.

Where user input is employed, a user interface may be generated for displaying images and accepting inputs regarding perceived artifacts or portions of an image which may have artifacts included. Such artifacts may be caused by specular effects, such as reflections, refractions, caustics, and the like (step 26), and may be related to a separation between a perceived location of a feature as between two stereographic images, which generally relates to the perceived depth of a feature, or the shape of a feature differing between two stereographic images, or a feature existing in one stereographic image but not the other (step 28).

One solution to the artifact is to alter parameters such that the artifact or an effect of the artifact is reduced (step 32). In particular, a different set of stereo camera offsets may be employ to visualize the view-dependent components giving rise to the artifact. Put another way, the stereo camera is modified or "dialed", to be different than that which gave rise to the artifact, so that the effect of the artifact is eliminated, or at least reduced or minimized. The altered parameters may cause the altering of the shape of the feature, the apparent stereo depth of the feature (via the feature separation as between left and right images), the intensity of a feature, the existence of a feature, or other modifications (step 36). In many cases such will be accomplished by changing the intraocular distance between the stereo cameras. In other cases, changing the convergence of the stereo camera will reduce the artifact. Other parameters may be modified to treat other artifacts.

Where the shape of the feature is altered, the shape may be altered to result in a shape that is similar to that perceived by the other eye. In this case, "similar" may refer to a general likeness in shape, e.g., a square for a square, a five pointed star for a five pointed star, the diamond for a diamond, and the like. The size may also be made generally commensurate, e.g., to within 5-20%.

If performed automatically, one or more parameters may be varied and a difference map created of the original artifact and the artifact following modification. By using the difference map to optimize modified parameters, the parameter modification may be automated.

As examples of ways which may be implemented both automatically or with user input, changing the intraocular distance may cause a highlight or feature shape to change, or may cause it to appear or disappear. To move where a highlight or feature appears, the convergence of the stereo camera may be altered. Other examples will also be seen for can rapidly be determined by trial and error. For example, a lookup table may be employed, expert rules, neural nets, or the like.

It is noted in this regard that multiple cameras have been employed to visualize scenes before, for purposes of achieving roundness and emphasis for, e.g., a character versus a background, but such have not related to eliminating artifacts due to view-dependent components of lighting.

In general the altering step is performed in the renderer following a lighting pass, e.g., a specular pass, and subsequent to the altering, the lighting pass may be performed again to determine the effects of the modifications of the stereo cameras on the perceived artifacts (step 34). Following the specular pass, the image from the specular pass may be composited with, e.g., that from a diffuse pass or other pass, e.g., during the color process.

In a subsequent step, which is optional, a re-projection step may be performed for view-independent components to achieve the second stereo view, while rendering is performed for view-dependent components using the different set of stereo camera offsets to reduce the effects of the artifact (step 38). Re-projection may be conveniently performed for the view independent components as the rendering of these is typically a more costly process, due to the required calculation of primary rays, secondary rays, etc. Use of re-projection where possible allows a significant savings in computation time, as the same is far more rapid than a full rendering. One method of re-projection is disclosed in U.S. patent application Ser. No. 13/649,720, filed Oct. 11, 2012, entitled "SYSTEM AND METHOD FOR RENDERING AFFECTED PIXELS", owned by the assignee of the present invention and herein incorporated by reference in its entirety.

Figure 4:
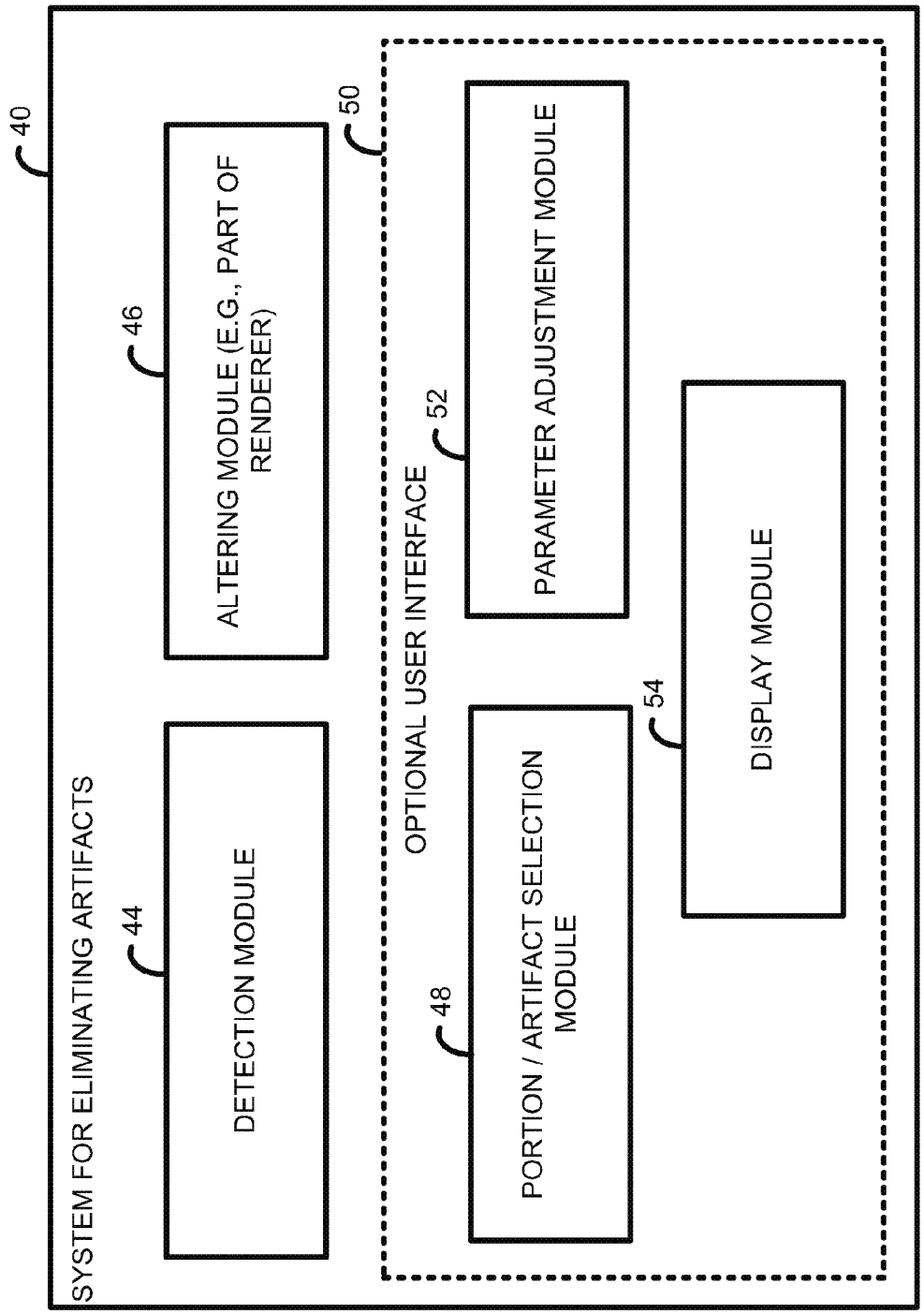
FIG. 4 depicts a modular system according to the principles described here.

Referring to FIG. 4, a system 40 is illustrated for eliminating artifacts. The system 40 includes a detection module 44 in which artifacts may be detected, e.g., by detecting an inappropriate stereo depth due to an overly large or small spacing between features between left and right images, by detecting differences in similarities of shapes of features as between left and right cameras, detecting differences in intensity between features, detecting the existence of a feature in one camera but not in the other, or the like. The detecting may be performed automatically, by analysis of features and the shape and location thereof, or with user input as discussed. The system 40 further includes an altering module 46, which is generally part of a renderer, in which an altering step may be performed following a specular pass for a view-dependent lighting component. The altering may be automatic or may employ a user input as have been discussed.

The system 40 can further include an optional user interface, for cases in which the detection and altering are not performed automatically. The optional user interface 50 can include a portion or artifact selection module 48, where a user can indicate a portion of an image or a particular artifact for treatment by the system. The optional user interface 50 can include a parameter adjustment module 52, through which a user can adjust parameters to reduce or eliminate artifacts, e.g., by dialing or altering the stereo camera intraocular distance or convergence. Other parameters may also be employed. The optional user interface 50 can further include a display module 54 to display results and to allow convenient user selection of artifacts or portions of images. Where a user interface is provided, the user may try various offsets or convergence values to adjust the separation of features, the shape of features, to draw a feature into existence or remove one from an image, to adjust an intensity of a feature to bring the feature more in line with another, or the like. All of the above, or other such alterings, are referred to herein as "resolving" the artifact.

What has been described are systems and methods for reducing artifacts from view-dependent lighting components, making images created by such components more desirable to a viewer's eye. It will be understood that additional variations and implementations are also possible. For example, the disclosed systems and methods can be applied to images from movies, television, video games, etc. The system and method may also be applied to non-specular lighting situations, e.g., any other effect that causes artifacts.

One implementation includes one or more programmable processors and corresponding computer system components to store and execute computer instructions, such as to provide the tools for creating CGI objects, performing rendering passes, identifying artifacts, and altering virtual camera offsets. One such computing environment is disclosed below.

Figure 5:
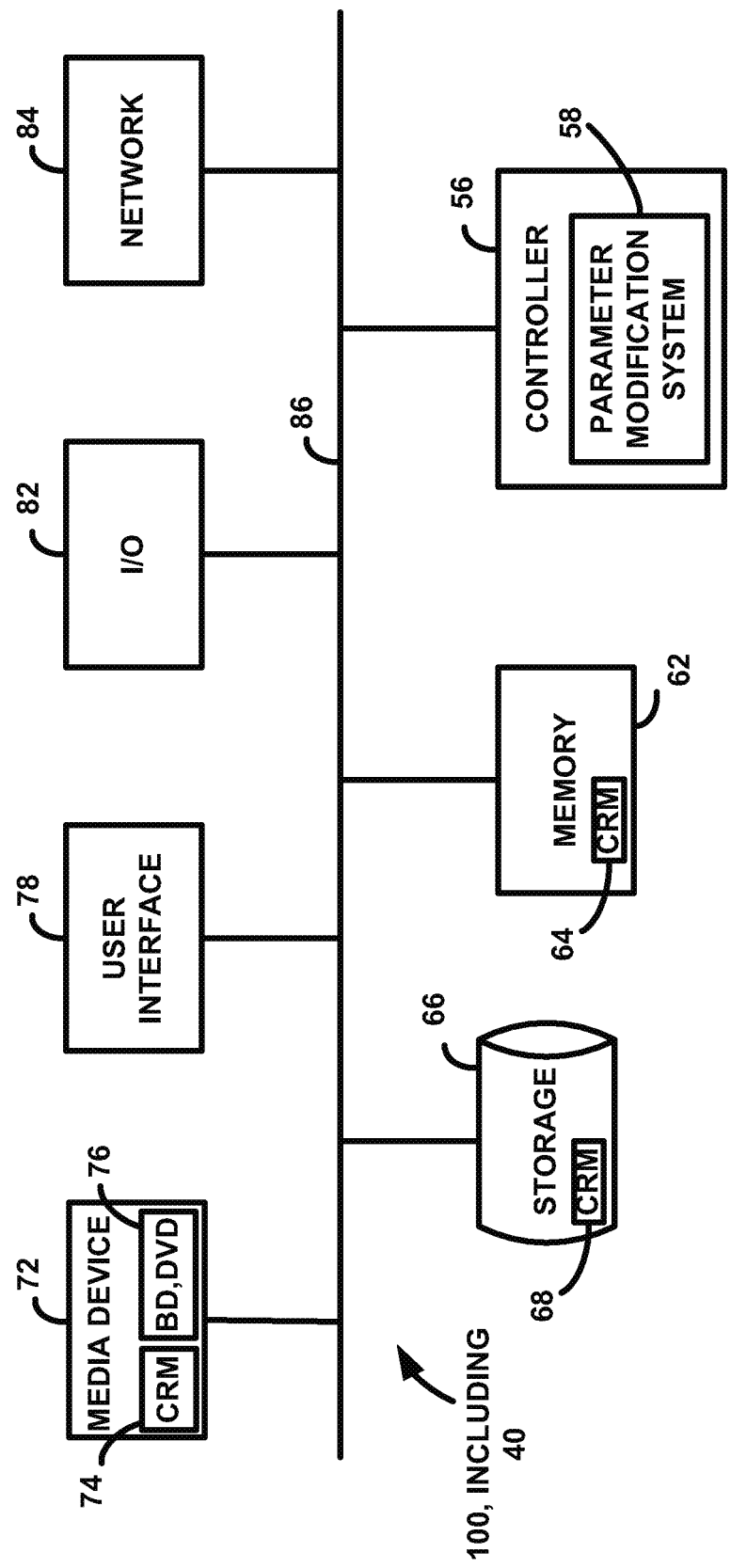
FIG. 5 depicts an exemplary computing environment in which the system may be implemented, and using which the method may be performed.

Referring to FIG. 5, a representation of an exemplary computing environment 100 which may be employed in the system and method is illustrated.

The computing environment 100 includes a controller 56, a memory 62, storage 66, a media device 72, a user interface 78, an input/output (I/O) interface 82, and a network interface 84. The components are interconnected by a common bus 86. Alternatively, different connection configurations can be used, such as a star pattern with the controller at the center.

The controller 56 includes a programmable processor and controls the operation of the system and its components. The controller 56 loads instructions from the memory 62 or an embedded controller memory (not shown) and executes these instructions to control the system.

Memory 62, which may include non-transitory computer-readable memory 64, stores data temporarily for use by the other components of the system. In one implementation, the memory 62 is implemented as DRAM. In other implementations, the memory 62 also includes long-term or permanent memory, such as flash memory and/or ROM.

Storage 66, which may include non-transitory computer-readable memory 68, stores data temporarily or long-term for use by other components of the computing environment, such as for storing data used by the system. In one implementation, the storage 66 is a hard disc drive or a solid state drive.

The media device 72, which may include non-transitory computer-readable memory 74, receives removable media and reads and/or writes data to the inserted media. In one implementation, the media device 72 is an optical disc drive or disc burner, e.g., a writable Blu-ray® disc drive 76.

The user interface 78 includes components for accepting user input, e.g., the user indication of artifacts, and presenting results of modifications of camera offsets to the user. In one implementation, the user interface 78 includes a keyboard, a mouse, audio speakers, and a display. The controller 56 uses input from the user to adjust the operation of the servers.

The I/O interface 82 includes one or more I/O ports to connect to corresponding I/O devices, such as external storage or supplemental devices, e.g., a printer or a PDA. In one implementation, the ports of the I/O interface 82 include ports such as: USB ports, PCMCIA ports, serial ports, and/or parallel ports. In another implementation, the I/O interface 82 includes a wireless interface for wireless communication with external devices. These I/O interfaces may be employed to connect to one or more content playback devices.

The network interface 84 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such computing environments, e.g., power and operating systems, though these components are not specifically shown in the figure for simplicity. In other implementations, different configurations of the computing environments can be used, e.g., different bus or storage configurations or a multi-processor configuration.

Various illustrative implementations of the present invention have been described. However, one of ordinary skill in the art will recognize that additional implementations are also possible and are within the scope of the present invention. And while the system and method may generally be implemented during rendering at a specular lighting pass, because it is important to see how specular, diffuse, reflective, refractive, and caustic effects appear, the system and method may also be employed at other points during the rendering.

Accordingly, the present invention is not limited to only those implementations described above.

The invention claimed is:

1. A method for resolving an artifact caused by a view-dependent lighting component, comprising:
   a. detecting an artifact caused by a view-dependent lighting component imaged by a stereo camera having a set of operating parameters; and
   b. altering the operating parameters of the view-dependent lighting component such that the artifact is resolved, wherein the altered operating parameters include an intraocular distance or a convergence or both, and wherein the altered operating parameters are different from operating parameters for a view-independent lighting component.

2. The method of claim 1, wherein the stereo camera is a virtual stereo camera.

3. The method of claim 1, wherein the altering is performed in a renderer following a specular pass.

4. The method of claim 1, wherein the stereo camera includes a first eye camera and a second eye camera, and further comprising:
   a. performing a projection step for one or more view independent components of an image from the first eye camera to create an image for the second eye camera; and
   b. performing a rendering step for one or more view-dependent components of an image to create an image for the second eye camera.

5. The method of claim 1, wherein the artifact is caused by a view-dependent lighting component that is specular.

6. The method of claim 5, wherein the specular component is caused by reflection, refraction, or a caustic.

7. The method of claim 1, wherein the detecting is performed with user input.

8. The method of claim 7, further comprising providing a user interface for displaying images from the stereo camera and for accepting user input on which portions of the images constitute artifacts.

9. The method of claim 1, wherein the detecting is performed automatically.

10. The method of claim 1, wherein the stereo camera includes a first eye camera and a second eye camera, and wherein the detecting further comprises:
    a. detecting a first feature imaged by the first eye camera caused by a view-dependent lighting component;
    b. detecting a second feature, corresponding to the first, imaged by the second eye camera caused by the view-dependent lighting component;
    c. determining a perceived depth of the artifact using the detected first and second feature; and
    d. if the perceived depth is not appropriate for the artifact, then adjusting the perceived depth by adjusting one or more parameters of the first and second eye cameras such that the perceived depth is appropriate for the artifact.

11. The method of claim 10, wherein if the perceived depth is not appropriate for the artifact due to a spacing between the first and second features by an amount exceeding 2% of the screen space, then adjusting the perceived depth by adjusting the one or more parameters of the first and second eye cameras such that the perceived depth is appropriate.

12. The method of claim 1, wherein the stereo camera includes a first eye camera and a second eye camera, and wherein the detecting further comprises:
    a. detecting an existence of a feature imaged by the first eye camera caused by a view-dependent lighting component;
    b. detecting if a corresponding feature has been imaged by the second eye camera caused by the view-dependent lighting component;
    c. if a corresponding feature has not been imaged by the second eye camera, then performing the altering.

13. The method of claim 12, wherein the altering includes generating a corresponding feature for the second eye camera.

14. The method of claim 1, wherein the stereo camera includes a first eye camera and a second eye camera, and wherein the detecting further comprises:
    a. detecting a first shape of a feature imaged by the first eye camera caused by a view-dependent lighting component;
    b. detecting a second shape of the feature, corresponding to the first, imaged by the second eye camera and caused by the view-dependent lighting component;
    c. determining if the first shape is similar to the second shape; and
    d. if the shapes are not similar, then adjusting one or both of the shapes such that the shapes are similar.

15. A non-transitory computer-readable medium, comprising instructions for causing a computing environment to perform the method of claim 1.

16. A system for resolving an artifact caused by a view-dependent lighting component, comprising:
    a. a detection module, the detection module for detecting an artifact caused by a view-dependent lighting component imaged by a stereo camera having a set of operating parameters; and b. an altering module for altering the operating parameters of the view-dependent lighting component such that the artifact is resolved wherein the altering module is configured to adjust the operating parameters including adjusting an intraocular distance or a convergence or both, and wherein the altered operating parameters are different from operating parameters for a view-independent lighting component.

17. The system of claim 16, wherein the altering module forms part of a renderer.

18. The system of claim 16, further comprising a user interface module for accepting user input about portions of images that are artifacts.

19. The system of claim 18, wherein the system includes a first virtual eye camera and a second virtual eye camera, and wherein the detection module is configured for detecting if:
   a. a feature caused by a view-dependent component imaged by the first and second eye cameras has an inappropriate stereo depth;
   b. a shape of a feature imaged by the first camera is substantially different than a shape of the feature imaged by the second camera; or
   c. a feature exists in an image from the first camera but not in an image from the second camera.

20. A method for resolving an artifact caused by a view-dependent lighting component, comprising:
   a. detecting an artifact caused by a view-dependent lighting component imaged by a stereo camera having a set of operating parameters; and
   b. altering the operating parameters such that the artifact is resolved,
   c. wherein the stereo camera includes a first eye camera and a second eye camera, and wherein the detecting further comprises:
      i. detecting a first feature imaged by the first eye camera caused by a view-dependent lighting component;
      ii. detecting a second feature, corresponding to the first, imaged by the second eye camera caused by the view-dependent lighting component;
      iii. determining a perceived depth of the artifact using the detected first and second feature; and
      iv. if the perceived depth is not appropriate for the artifact, then adjusting the perceived depth by adjusting one or more parameters of the first and second eye cameras such that the perceived depth is appropriate for the artifact.

* * * * *